July 26, 1949.    J. ARMBRUST    2,477,031
SAUSAGE LINKING MACHINE
Filed Sept. 14, 1948
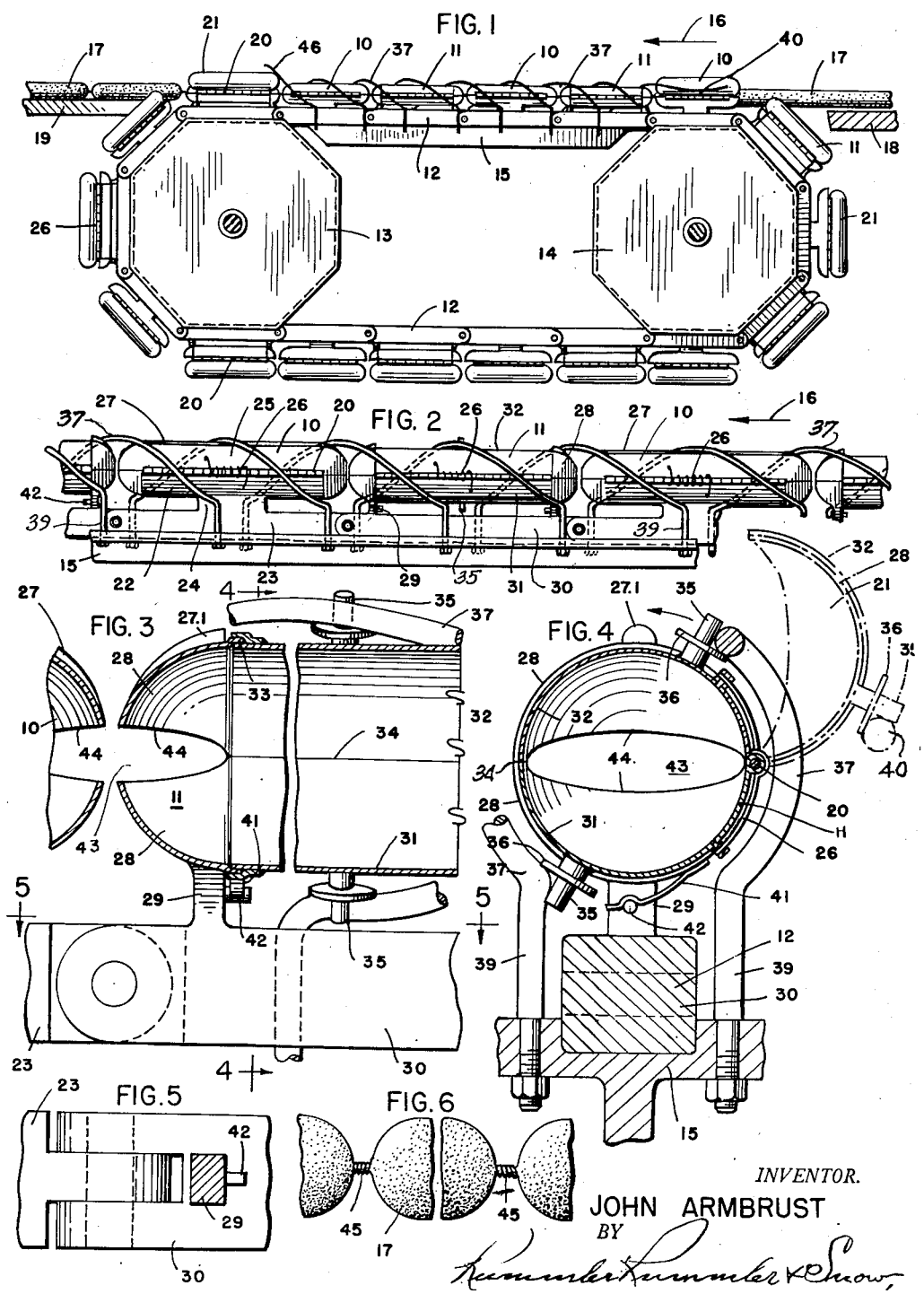
INVENTOR.
JOHN ARMBRUST
BY
ATT'YS Patented July 26, 1949

2,477,031

UNITED STATES PATENT OFFICE 2,477,031

SAUSAGE LINKING MACHINE

John Armbrust, Chicago, Ill., assignor of one-half to Christ W. Eckert, Chicago, Ill.

Application September 14, 1948, Serial No. 49,156

6 Claims. (Cl. 17—34)

This invention relates to machines for automatically forming sausage links by twisting the casings at points between such links.

The main objects of this invention are to provide improved mechanism for dividing a filled sausage casing in link lengths by twisting the casing at points between such links; to provide improved means for performing this operation in such manner as to produce links of uniform dimensions with a minimum of attention on the part of an operator; and to provide improved simple and efficient mechanism for accomplishing these objects.

An illustrative embodiment of the invention is shown somewhat schematically in the accompanying drawings in which:

Figure 1 is a side elevation of the operating mechanism of a sausage linking machine embodying the present invention but omitting, for the sake of clearness, supporting frame structures and other details which do not contribute directly to the link-forming functions of the machine.

Fig. 2 is a fragmentary detail on a larger scale showing structural features of the link holders and mechanism for rotating them as they move along the operating flight of their travel.

Fig. 3 is an enlarged fragmentary sectional detail of structural features of the link-holding shells in relation to certain features with which they cooperate.

Fig. 4 is a related detail of the same, showing some parts in transverse section on the line 4—4 of Fig. 3 and some additional parts in elevation and in broken lines to show the body and lid relation of the mold shell structure.

Fig. 5 is a detail of the conveyor link belt taken on the line 5—5 of Fig. 3.

Fig. 6 is a fragmentary detail illustrating the manner in which the sausage casing is twisted between links.

In the form shown in the drawings, the machine comprises two types of sausage link holders or forming shells 10 and 11 mounted end to end for travel in the direction of their common longitudinal axis in an endless path. The shells 10 and 11 are mounted on an appropriate carrier, preferably in the form of a link belt 12, with pivotally connected links for separately supporting the individual sausage link-holding shells. The belt 12 is carried by sprocket wheels 13 and 14, appropriately formed in any well-known fashion, for supporting and positively driving the link belt 12. The upper or operating flight of the link belt travels along a guide member 15 suitably formed to maintain this flight of the conveyor in a straight line of travel.

In Figure 1 the direction of travel of the upper flight of the link belt is indicated by the arrow 16. The sausage casing stuffing machine is assumed to be located at the right in position to feed the stuffed casing 17 along a feed table 18 into the path of the holder shells on the conveyor. At the left of the Fig. 1 the finished sausages 17 are delivered to a delivery table or chute 19.

Each of the link-forming holders 10 and 11 is split longitudinally, preferably on a horizontal plane through the longitudinal axis and the shell parts of the holders are hinged together at 20 along one side so that one of them serves as a lid 21 that may be swung to an open or closed position with respect to the other, as indicated in Fig. 4.

Each of the holders 10 comprises a trough-like body shell 22, rigidly attached to its belt link 23 by a bracket 24, and a closure lid section 25. A torsion spring 26 mounted on the pintle of the hinge 20 normally urges the lid 25 to its open position. The lid is provided with a longitudinal guide rib 27 on its upper side which serves to hold the lid closed while the link casing is traveling along the operating flight of the belt as will hereinafter appear.

The intermediate holders 11 differ somewhat from the holders 10 in order to permit of their relative rotation for twisting the sausage casings to form the link-connecting strands. In the form shown, the holder shells 11 consist of spaced stationary end fixtures 28 connected by brackets 29 to the link 30 and connected to each other by a cylindrical body portion.

This cylindrical body portion is mounted by means of appropriate tongue and groove joints 33 for rotation on the end members 28. Both the end members 28 and the intermediate body portion of the holders 11 are split along the same diametric plane of line 34 and the parts 31 and 32 are hinged together at 20 to permit the opening and closing of the shell about the hinge 20. Each body part 31 and 32 is provided with a radially projecting stud 35 having a fixed collar 36.

Throughout the greater portion of the operating flight of the path of travel of the shells, as indicated in Fig. 1, their lids are held closed by suitable guide means which, in the form shown, consist of a series of arched wire 37 which are spirally twisted in screw fashion around the path of the shells 10 and 11 in position to engage the studs 35 for rotating the body portions of the shells 11 as these shells travel in the direction of the arrow 16 in Fig. 1. In order to clear the bracket connections between the shells 10 and 11 and their carrier belt and to provide for continuous rotation of the shells 11, it is necessary to provide enough of these wire arches to conform to two or more coaxial spiral paths around the axis of travel of the shells, so that one or the other of the studs 35 on the shell 11 will always be causing rotation, despite the gaps in the respective threads of the multiple threaded screw paths to which the wire arches conform.

As shown in Figs. 2 and 4 the spiral portions of the arches 37 terminate in posts 39 located clear of the paths of the studs 35 and fastened as indicated in Fig. 4 to the guide member 15. At the supply end of the operating flight of the conveyor belt, there is an appropriately inclined guide 40 which engages and causes the lids of the shells 10 and 11 to close after passing their load-receiving position at the right of Fig. 1. Thereafter the lids of the shells 10 are maintained closed by contact of the ribs 27 with the wire arches 37; and the mold shells 11 are maintained closed by the engagement of the collars 36 with the arches 37, while their body portions are rotated by the engagement of the studs 35 with the arches 37.

The arches 37 terminate about one link length short of the delivery end of the operating flight, so as to permit the opening of the shells 10 and 11 before being deflected out of their straight line path in the course of their travel around the sprocket 13, so that the completed sausages may be delivered to the platform 19.

It will be understood that the relation of the pins 35 and the arches 37 in front of this delivery position is such that the parts of the shells 11 will be left in exactly the relative rotary positions in which they are shown in Fig. 4 so that the halves 31 and 32 of the body shell will exactly register with the halves of the end members 28 at the plane represented by the line 34 in Figures 3 and 4.

In order to maintain the halves of the shells 11 in this status of angular relation to the fixed end members 28 during their travel around the remaining parts of the path of the conveyor 12, the half shell 31 has detent springs 41 attached thereto at its opposite ends to engage stop pins 42 on the brackets 29. The detent springs 41 are so formed and disposed that, in addition to holding the shells 11 in position for their lids to close properly upon engagement with the guide surfaces 40, these detents 41 readily ride over the stop pins 42 at times when the studs 35 are compelling rotation of the shells 11.

The end members 28 of the shells 11 and corresponding end portions of the shells 10 are of approximately hollow spherical curvature and are provided with axial openings 43 where the twisting of the sausage casing takes place to form the connecting string-like necks between the successive sausage links.

The lips 44 which form the margins of these openings are so formed and disposed as to press upon the sausage casing so as to define the points at which the twisting of the sausage casing will take place without, however, pinching or injuring the sausage casing in the process.

The sausage casings are held in the usual manner on the outlet spout of the filling machine so that filled casings 17 will pass along the feed platform 18 into the open shells at the right of the upper flight of the conveyor as shown in Fig. 1. The guide 40 then causes the cover of the holding shell to close to permit the shell to pass through the arches 37. Succeeding shells 10 or 11, as the case may be, on arriving at this point close on the sausage casing in proper relation to the preceding shells. The fixed shells 10 hold the casing firmly at the opposite ends of each alternate shell 11 which, while gripping the sausage casing, is caused to rotate through contact of its studs 35 with the arches 37 to twist the sausage casing to form necks 45 between the sausage links 17, as indicated in Fig. 6.

As each shell arrives at the left-hand end of its flight of horizontal travel, as indicated in Fig. 1, its lid is swung open by its spring 26. Such opening may be made gradual by an appropriately located guide 46. As the holding shells pass around the sprocket 13, their adjacent ends tend to separate as indicated in Fig. 1 and this action causes the descending shell to pull away from the sausage link that it has formed and automatically delivers the finished sausage 17 to the delivery platform 19.

Although but one specific embodiment of this invention is herein shown and described, it will be understood that numerous details of the structure shown may be altered or omitted without departing from the spirit of the invention as defined by the following claims.

I claim:

1. A sausage linking machine, comprising a series of sausage-linking shells mounted end to end, conveyor means for said shells for causing said series of shells to travel in an endwise direction, means associated with said conveyor and actuated by such endwise travel to rotate alternate shells relative to the intermediate ones on their common axis, each of said shells comprising a pair of shell sections divided on a longitudinal plane and hinged together at one side, and guide means operatively associated with said shells for opening and closing said shells.

2. A sausage linking machine, comprising an endless conveyor means, a series of elongated sausage link-holding shells mounted on said conveyor means and positioned end to end along the path of travel of said conveyor means, said shells having end openings and being split longitudinally through said openings to provide a lid portion hinged longitudinally to a body portion, means associated with said shells for normally urging said lid portions to an open position, means associated with said conveyor for closing said lid portions through the movement of said conveyor, and means associated with said conveyor for rotating certain of said shells relative to others through the movement of said conveyor.

3. A sausage linking machine, comprising an endless belt, a series of sausage link-forming shells carried by said belt in end to end relation to each other, each of said shells being open at its ends and split longitudinally through said open ends to provide a closure lid hinged to the shell body, means associated with said belt for closing said lids at one place in the travel of said belt, means associated with said belt for rotating alternate shells with respect to the intermediate ones about their common longitudinal axis, and means associated with said shells for opening said lids through movement of the belt after a predetermined amount of such rotation.

4. A sausage linking machine, comprising an endless belt, a series of sausage link-forming shells carried by said belt in end to end relation to each other, each of said shells being open at its ends and split longitudinally through said open ends to provide a closure lid hinged to the shell body, means operatively associated with said shells for closing said lids at one place in the travel of said belt, lugs on alternate shells, spiral abutment means fixed adjacent to the path of said shells and positioned to engage said lugs for rotating such alternate shells with respect to the intermediate ones about their common longitudinal axis, and means associated with said spiral abutment means for opening said shells after a predetermined amount of such rotation.

5. A sausage linking machine, comprising an endless conveyor means, a series of elongated sausage link-holding shells mounted end to end along the path of travel of said conveyor means, said shells having end openings and being split longitudinally through said openings to provide a lid portion hinged longitudinally to a body portion, means fixedly mounting alternate ones of said shells on said conveyor means, means on said conveyor means for holding the intermediate ones of said shells to permit axial rotation thereof relative to said conveyor means, means associated with said conveyor means for closing said lid portions through movement of said conveyor means at one point in its travel, means operatively associated with said conveyor means for opening said lids through movement of said conveyor means at another point in its travel, and means operatively associated with said conveyor means for rotating said intermediate shells through the movement of said conveyor means during their travel between said named points.

6. A sausage linking machine, comprising an endless conveyor means, a series of elongated sausage link-holding shells mounted end to end along the path of travel of said conveyor means, said shells having end openings and being split longitudinally through said openings to provide a lid portion hinged longitudinally to a body portion, means fixedly mounting alternate said shells on said conveyor means, supporting means for holding the intermediate said shells to permit axial rotation thereof relative to said conveyor means, means associated with said shells for closing said lid portions through movement of said conveyor means at one point in its travel, means associated with said shells for opening said lids through movement of said conveyor means at another point in its travel, and means associated with said conveyor means for rotating said intermediate shells through the movement of said conveyor means during their travel between said named points, said last-named means comprising a pair of angularly spaced lugs on each of the respective said rotatable shells and means to provide abutments of screw formation extending along the path of said conveyor between said named points to engage said lugs and rotate said intermediate shells to twist the sausage casing between adjacent shells.

JOHN ARMBRUST.

No references cited.